(12) United States Patent
Williams

(10) Patent No.: US 6,178,677 B1
(45) Date of Patent: Jan. 30, 2001

(54) VEHICLE-MOUNTED, REAR-DIRECTED MESSAGE DISPLAY APPARATUS

(76) Inventor: Frederick A. Williams, 7935 Thomasville Rd., Tallahassee, FL (US) 32312

( * ) Notice: Under 35 U.S.C. 154(b), the term of this patent shall be extended for 0 days.

(21) Appl. No.: 09/293,130

(22) Filed: Apr. 16, 1999

(51) Int. Cl.[7] .................................................. G09F 21/04
(52) U.S. Cl. ............................ 40/593; 340/902; 40/564
(58) Field of Search ............................ 40/593, 591, 564; 340/902

(56) References Cited

U.S. PATENT DOCUMENTS

| Re. 35,686 | * | 12/1997 | Robinson et al. | 340/902 |
|---|---|---|---|---|
| 2,156,806 | * | 5/1939 | Ducey | 40/205 |
| 2,612,548 | * | 9/1952 | Swanson | 40/564 |
| 3,026,498 | | 3/1962 | Galliers . | |
| 4,071,883 | * | 1/1978 | Dennis | 40/574 |
| 4,264,979 | * | 4/1981 | Gutowski | 40/593 |
| 4,449,167 | | 5/1984 | Cohen . | |
| 4,470,214 | | 9/1984 | Kinloch . | |
| 4,574,269 | * | 3/1986 | Miller | 40/593 |
| 4,860,476 | * | 8/1989 | Hall | 40/591 |
| 5,099,594 | | 3/1992 | Reas et al. . | |
| 5,838,228 | | 11/1998 | Clark . | |

* cited by examiner

Primary Examiner—Cassandra H. Davis

(57) ABSTRACT

A vehicle-mounted, rear-directed message display apparatus includes a housing which includes a transparent rear wall, a front wall, side walls, a bottom wall, and a cover. Support assemblies are connected to the side walls and extend downward. Illumination lamps are supported inside the housing near the front wall. A display sign is supported inside the housing between the illumination lamps and the transparent rear wall. The display sign includes an opaque background and transparent message lettering. An illumination control switch is electrically connected to the illumination lamps. With the invention installed in a front vehicle, when the driver of the front vehicle thinks that a following vehicle is following too closely, the driver of the front vehicle can operate the illumination control switch to light the illumination lamps to illuminate the display sign to warn the driver of the following vehicle that the following vehicle is following too closely. The front wall includes an illumination monitor aperture so that a driver can observe the status of the message display in the rear view mirror of the vehicle. With another embodiment of the invention, each of the support assemblies further includes a lock nut connected to a respective strut-to-housing connector portion for locking the housing in a selected orientation angle with respect to the respective support assembly.

2 Claims, 4 Drawing Sheets

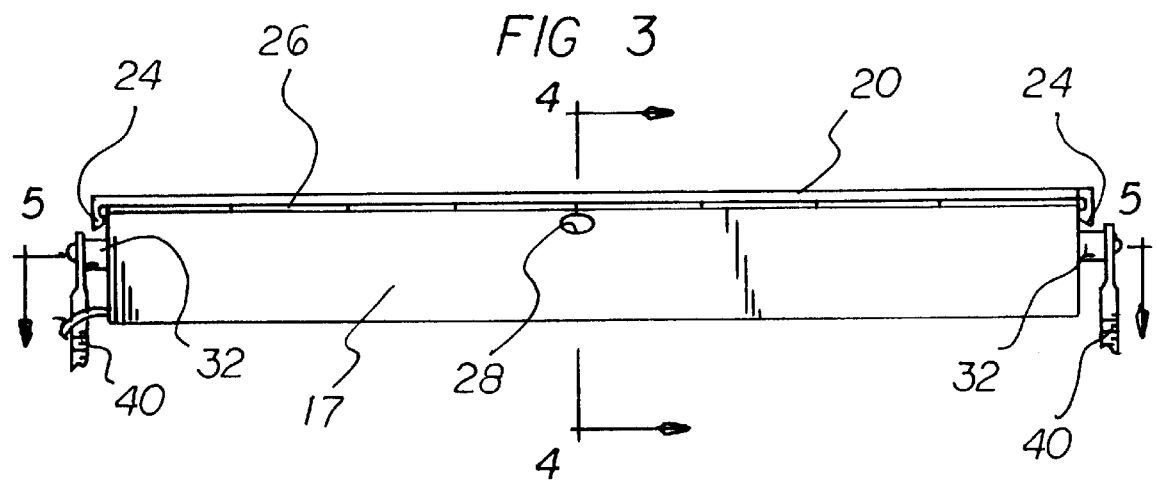
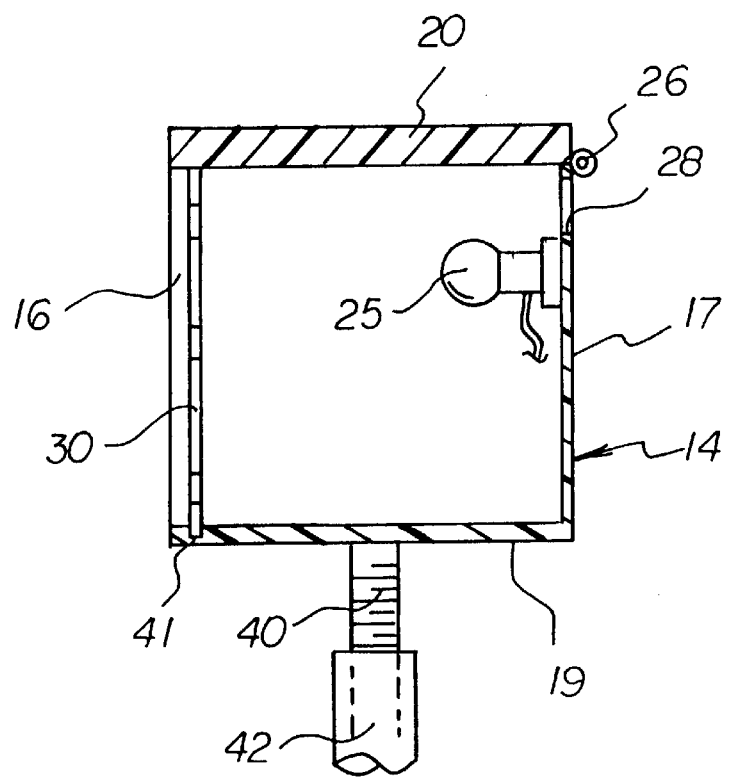

VEHICLE-MOUNTED, REAR-DIRECTED MESSAGE DISPLAY APPARATUS

BACKGROUND OF THE INVENTION

1. Field of the Invention

The present invention relates generally to vehicle-mounted display signs and, more particularly, to vehicle-mounted display signs that are visible from behind the rear window of a front vehicle to warn a following vehicle against following too closely.

2. Description of the Prior Art

The problem of one vehicle following another vehicle too closely ("tailgating") is well known. Throughout the years, a number of innovations have been developed relating to warning drivers of following vehicles that they are following a vehicle in front of them too closely. In this respect, the following U.S. patents are representative of some of those innovations: U.S. Pat. Nos. 3,026,498, 4,449,167, and 5,838,228. More specifically, U.S. Pat. No. 3,026,498 employs an apparatus in a front vehicle that has an illuminated sign that warns a following vehicle to keep its distance based upon a light sensor in the front vehicle that detects the headlights of a following vehicle. Such a device is not useful when the following vehicle is not using headlights, such as during the daytime. In this respect, it would be desirable if an illuminated message sign were provided in a front vehicle to warn a following vehicle about following too closely that does not depend upon sensing light from headlights in the following vehicle.

U.S. Pat. No. 4,449,167 discloses an illuminated, rear-facing message sign for a vehicle that depends upon pressing a brake pedal for its illumination. There are times when the driver of a front car wishes to warn the driver of a following car about following too closely, but the driver of the front car wishes to maintain speed, and does not want to put pressure upon the brake pedal. In this respect, it would be desirable if a rear-facing illuminated sign provides warning to a driver in a following car from following too closely without depending upon a brake pedal sensor for activating the illuminated sign.

U.S. Pat. No. 5,838,228 discloses a system for preventing rear end collisions which depends upon electronically sensing a distance between a front vehicle and a following vehicle and calculating a safe following distance factoring in the speed of the vehicles. For purposes of simplicity and direct control by a driver of a front vehicle, it would be desirable if the driver of a front vehicle had manual control over the illumination of a rear-facing message sign for warning a driver in a following vehicle that the vehicle is following too closely.

As a matter of interest, U.S. Pat. No. 4,470,214 discloses a display sign for the rear window of a vehicle. The illumination of the sign is controlled by a driver selectively placing a power plug in a cigarette lighter. The sign itself is illuminated by a light shining on it from the rear-facing side of the sign. Rather than occupy a cigarette lighter, it would be desirable if a manually operated switch were provided for an illuminated sign that is independent of the cigarette lighter. In addition, to provide greater visual contrast between the message of a sign and its background, it would be desirable if the message of the sign were back-lighted.

Also, as a matter of interest, U.S. Pat. No. 5,099,594 discloses a vehicle-mounted message display that uses suction cups for mounting the message display on the inside surface of a rear window of a vehicle. Rather than mounting a message sign on a glass window, to avoid the stresses to the glass that such a mounting entails, it would be desirable if a message display for a rear window sign were mounted on the horizontal surface located between the back of the rear seat and the rear window.

Still other features would be desirable in a vehicle-mounted, rear-directed message display apparatus. For example, when a driver in a front vehicle looks in one's rear view mirror to see if a rear-facing message sign is operating properly, it is difficult to ascertain proper operation. In this respect, it would be desirable if a rear-facing sign had a forward-facing aperture that emitted light when the rear-facing sign is illuminated. In this way, a driver looking in the rear view mirror can see a forward shining light as evidence that the rear-facing sign is working properly.

Different drivers may have different preferences for specific wordings in rear-facing signs. In this respect, it would be desirable if a rear-facing sign had a variety of interchangeable messages that would appeal to a variety of drivers.

Thus, while the foregoing body of prior art indicates it to be well known to use rear-facing message signs in vehicles, the prior art described above does not teach or suggest a vehicle-mounted, rear-directed message display apparatus which has the following combination of desirable features: (1) provides an illuminated message sign in a front vehicle to warn a following vehicle about following too closely that does not depend upon sensing light from headlights in the following vehicle; (2) provides a rear-facing illuminated sign to warn a driver in a following car from following too closely without depending upon a brake pedal sensor for activating the illuminated sign; (3) enables the driver of a front vehicle to have manual control over the illumination of a rear-facing message sign for warning a driver in a following vehicle that the vehicle is following too closely; (4) provides a manually operated switch for an illuminated sign that is independent of the cigarette lighter of the vehicle; (5) provides back-lighting for the message of the sign; (6) provides a rear window sign that is mounted on the horizontal surface located between the back of the rear seat and the rear window of a vehicle; (7) provides a rear-facing sign has with a forward-facing aperture that emits light when the rear-facing sign is illuminated; and (8) provides a rear-facing sign has a variety of interchangeable messages that would appeal to a variety of drivers. The foregoing desired characteristics are provided by the unique vehicle-mounted, rear-directed message display apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a vehicle-mounted, rear-directed message display apparatus that includes a housing which includes a transparent rear wall, a front wall, side walls, a bottom wall, and a cover. Support assemblies are connected to the housing. An illumination assembly is supported inside the housing. A display sign is supported inside the housing between the illumination assembly and the transparent rear wall. An illumination control switch is electrically connected to the illumination assembly by an electrical conductor. With the invention installed in a front vehicle, when the driver of the front vehicle thinks that a following vehicle is following too closely, the driver of the front vehicle can operate the illumination control switch to light the illumination assembly to warn the driver of the following vehicle that the following vehicle is following too closely.

The display sign includes an opaque background and transparent message lettering. Each of the side walls includes a sign-reception groove. The bottom wall also includes a sign-reception groove. The front wall includes an illumination monitor aperture. A hinge is connected between the cover and the front wall. A cover latch is connected to the cover, and a latch locking member is connected to each one of the side walls for engaging a respective cover latch when the cover is closed.

The support assemblies are connected to the side walls of the housing. Each of the support assemblies includes a support base plate and base-plate-to-vehicle fasteners for attaching the support base plate to a horizontal surface located between the back of a rear seat and rear window of a vehicle. An internally threaded cylindrical riser member is connected to the support base plate. An externally threaded strut is adjustably connected to the cylindrical riser member by interengagement of the internal and external threads. A strut-to-housing connector portion is connected to the strut. A connector-portion-reception bracket is provided. An offset bushing is located between the connector-portion-reception bracket and one of the side walls, and fasteners are provided for connecting the connector-portion-reception bracket and the offset bushing to the side wall.

With another embodiment of the invention, each of the support assemblies further includes a lock nut is connected to a respective strut-to-housing connector portion for locking the respective housing in a selected orientation angle with respect to the respective support assembly.

The illumination assembly includes lamps and electrical conductors connected between the lamps located inside the housing. The illumination control switch is connected to the lamps by an electrical conductor. A battery for the vehicle is employed as the source of electrical power, and an electrical conductor is connected between the illumination control switch and the battery. An electrical conductor is connected between the battery and the lamps. The illumination control switch can be mounted on the dashboard of the vehicle giving easy access to the driver.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle-mounted, rear-directed message display apparatus which has all of the advantages of the prior art and none of the disadvantages.

It is another object of the present invention to provide a new and improved vehicle-mounted, rear-directed message display apparatus which may be easily and efficiently manufactured and marketed.

It is a further object of the present invention to provide a new and improved vehicle-mounted, rear-directed message display apparatus which is of durable and reliable construction.

An even further object of the present invention is to provide a new and improved vehicle-mounted, rear-directed message display apparatus which is susceptible of a low cost of manufacture with regard to both materials and labor, and which accordingly is then susceptible of low prices of sale to the consuming public, thereby making such vehicle-mounted, rear-directed message display apparatus available to the buying public.

Still yet a further object of the present invention is to provide a new and improved vehicle-mounted, rear-directed message display apparatus which provides an illuminated message sign in a front vehicle warns a following vehicle about following too closely that does not depend upon sensing light from headlights in the following vehicle.

Still another object of the present invention is to provide a new and improved vehicle-mounted, rear-directed message display apparatus that provides a rear-facing illuminated sign to warn a driver in a following car from following too closely without depending upon a brake pedal sensor for activating the illuminated sign.

Yet another object of the present invention is to provide a new and improved vehicle-mounted, rear-directed message display apparatus which enables the driver of a front vehicle to have manual control over the illumination of a rear-facing message sign for warning a driver in a following vehicle that the vehicle is following too closely.

Even another object of the present invention is to provide a new and improved vehicle-mounted, rear-directed message display apparatus that provides a manually operated switch for an illuminated sign that is independent of the cigarette lighter of the vehicle.

Still a further object of the present invention is to provide a new and improved vehicle-mounted, rear-directed message display apparatus which provides back-lighting for the message of the sign.

Yet another object of the present invention is to provide a new and improved vehicle-mounted, rear-directed message display apparatus that provides a rear window sign that is mounted on the horizontal surface located between the back of the rear seat and the rear window of a vehicle.

Still another object of the present invention is to provide a new and improved vehicle-mounted, rear-directed message display apparatus which provides a rear-facing sign has with a forward-facing aperture that emits light when the rear-facing sign is illuminated.

Yet another object of the present invention is to provide a new and improved vehicle-mounted, rear-directed message display apparatus that provides a rear-facing sign has a variety of interchangeable messages that would appeal to a variety of drivers.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a front view of the top portion of the embodiment of the invention shown in FIG. 2 taken along line 3—3 thereof.

FIG. 4 is an enlarged cross-sectional view of the embodiment of the invention shown in FIG. 3 taken along line 4—4 thereof.

DESCRIPTION OF THE PREFERRED EMBODIMENT

Figure 1:
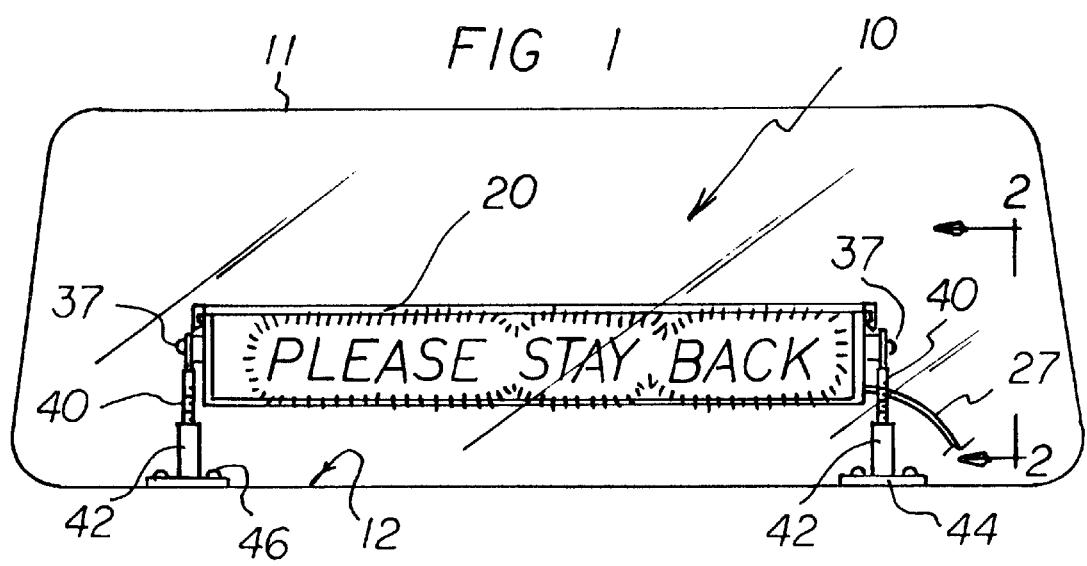
FIG. 1 is a rear view showing a first embodiment of the vehicle-mounted, rear-directed message display apparatus of the invention mounted on the horizontal surface located between the back of the rear seat and the rear window.
Figure 2:
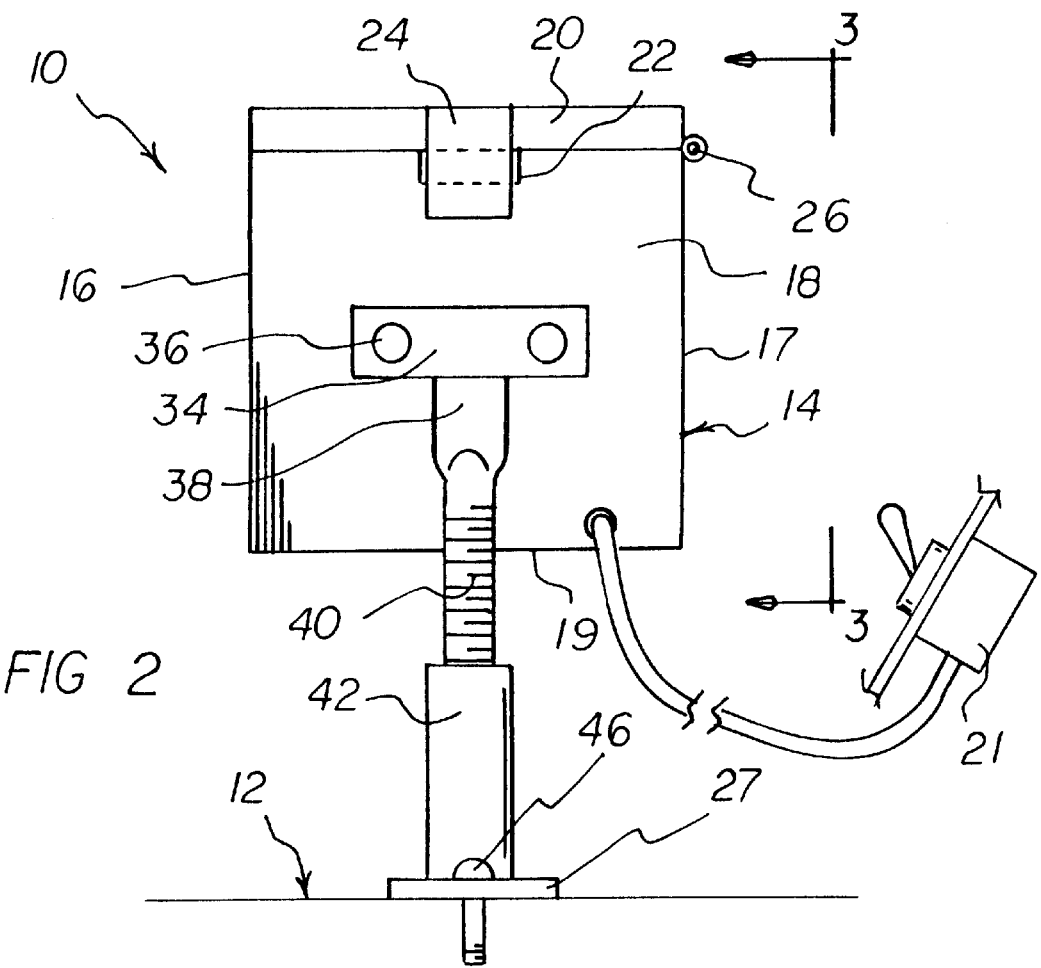
FIG. 2 is an enlarged side view of the embodiment of the vehicle-mounted, rear-directed message display apparatus shown in FIG. 1 taken along line 2—2 of FIG. 1.
Figure 5:
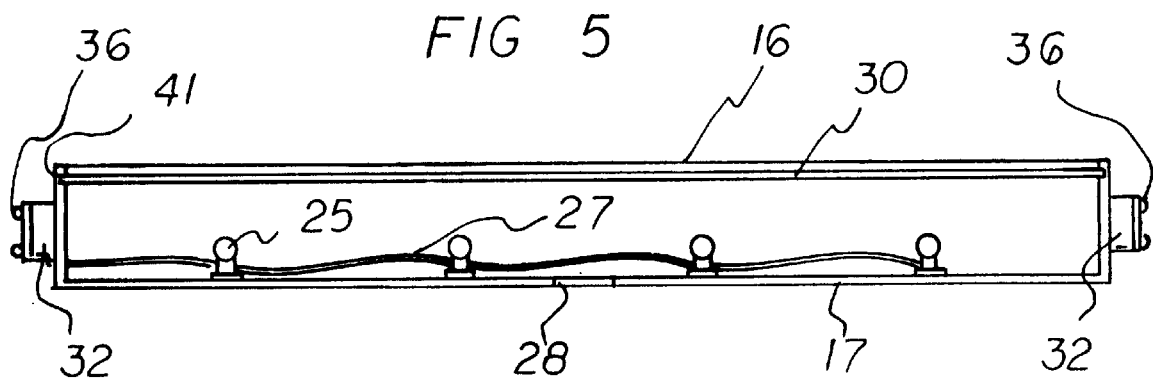
FIG. 5 is a cross-sectional view of the embodiment of the invention shown in FIG. 3 taken along line 5—5 thereof.

With reference to the drawings, a new and improved vehicle-mounted, rear-directed message display apparatus embodying the principles and concepts of the present invention will be described.

Turning to FIGS. 1–5 and 7, there is shown a first embodiment of the vehicle-mounted, rear-directed message display apparatus of the invention generally designated by reference numeral 10. In the first embodiment, the vehicle-mounted, rear-directed message display apparatus 10 includes a housing 14 which includes a transparent rear wall 16, a front wall 17, side walls 18, a bottom wall 19, and a cover 20. Support assemblies are connected to the housing 14. An illumination assembly is supported inside the housing 14. A display sign 30 is supported inside the housing 14 between the illumination assembly and the transparent rear wall 16. An illumination control switch 21 is electrically connected to the illumination assembly by an electrical conductor 27. With the invention installed in a front vehicle, when the driver of the front vehicle thinks that a following vehicle is following too closely, the driver of the front vehicle can operate the illumination control switch 21 to light the illumination assembly to warn the driver of the following vehicle that the following vehicle is following too closely.

The display sign 30 includes an opaque background and transparent message lettering. Each of the side walls 18 includes a sign-reception groove 41. The bottom wall 19 also includes a sign-reception groove 41. The front wall 17 includes an illumination monitor aperture 28. A hinge 26 is connected between the cover 20 and the front wall 17. A cover latch 24 is connected to the cover 20, and a latch locking member 22 is connected to each one of the side walls 18 for engaging a respective cover latch 24 when the cover 20 is closed.

The support assemblies are connected to the side walls 18 of the housing 14. Each of the support assemblies includes a support base plate 44 and base-plate-to-vehicle fasteners 46 for attaching the support base plate 44 to a horizontal surface 12 located between the back of a rear seat and rear window of a vehicle. An internally threaded cylindrical riser member 42 is connected to the support base plate 44. An externally threaded strut 40 is adjustably connected to the cylindrical riser member 42 by interengagement of the internal and external threads. A strut-to-housing connector portion 38 is connected to the strut 40. A connector-portion-reception bracket 34 is provided. An offset bushing 32 is located between the connector-portion-reception bracket 34 and one of the side walls 18, and fasteners 36 are provided for connecting the connector-portion-reception bracket 34 and the offset bushing 32 to the side wall 18.

Figure 6:
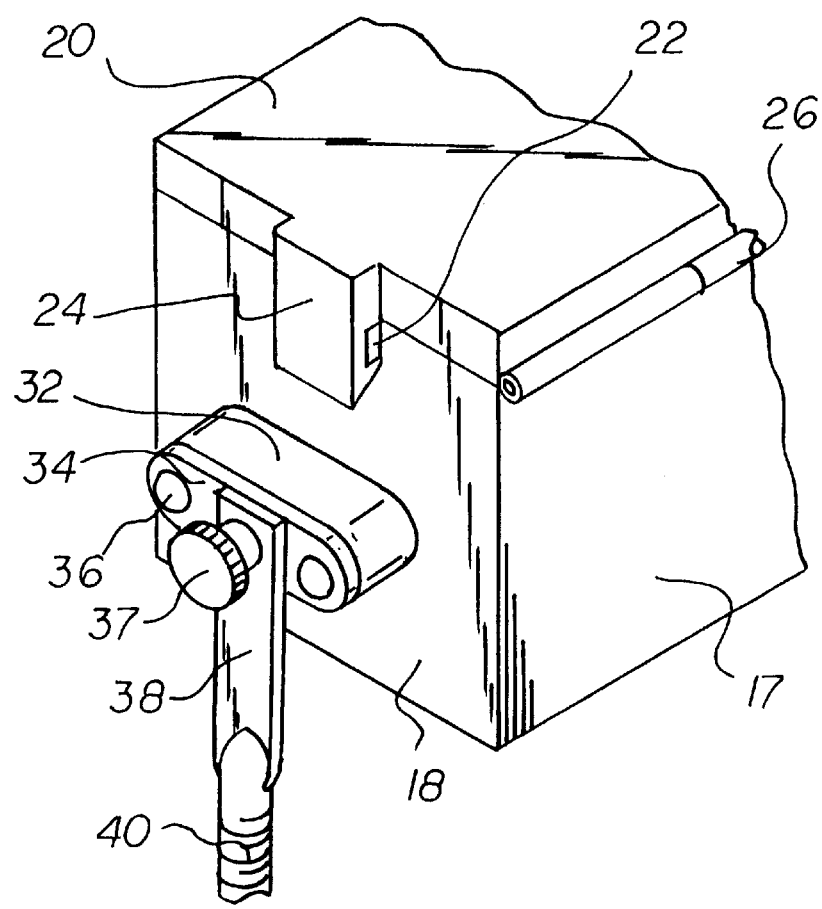
FIG. 6 is an enlarged perspective view of an end portion of a second embodiment of the invention which includes an angular adjustment mechanism for the sign housing.

As shown in FIG. 6 with another embodiment of the invention, wherein each of the support assemblies further includes a lock nut 37 is connected to a respective strut-to-housing connector portion 38 for locking the respective housing 14 in a selected orientation angle with respect to the respective support assembly.

To install the message display apparatus 10 of the invention in a vehicle, the support base plates 44 are mounted on the horizontal surface 12 located between the back of the rear seat and the rear window using base-plate-to-vehicle fasteners 46, such as screws. The height of the housing 14 with respect to the support base plate 44 is determined by the cumulative length of the amount of the strut 40 extending out from the cylindrical riser member 42 and the length of the cylindrical riser member 42. For higher installations, the strut 40 is unscrewed from the cylindrical riser member 42 to increase the cumulative length. For lower installations, the strut 40 is screwed into the cylindrical riser member 42 to decrease the cumulative length. Once the desired installation height is adjusted, the strut-to-housing connector portion 38 is slipped between the connector-portion-reception bracket 34 and the offset bushing 32, and the fasteners 36 are tightened to secure the strut-to-housing connector portion 38 to the housing 14. The height of the installation is determined by a number of factors such as the height of the rear window of the vehicle, the height of the driver, and the height of the housing 14.

There can be a variety of different display signs 30, and each can display a different message. For example, as shown in FIG. 1, the message can read "PLEASE STAY BACK". Other display signs 30 with other messages can read "YOU'RE TOO CLOSE", "PLEASE GET BACK", "PLEASE FALL BACK", "PLEASE BACK OFF", and "DON'T TAILGATE", among others.

To install a selected display sign 30 in the housing 14, the cover latches 24 are lifted off of the latch locking members 22, and the cover 20 is swung upward around the hinge 26. A selected display sign 30 in slipped into the sign-reception grooves 41 in the side walls 18 and the bottom wall 19. Then, the cover 20 is closed, and the cover latches 24 locked onto the latch locking members 22. To change the display sign 30, the cover latch 24 are unlocked, the cover 20 is opened, one display sign 30 is slipped out from the sign-reception grooves 41. A new display sign 30 is slipped into the sign-reception grooves 41, and the cover 20 is closed and locked.

Figure 7:
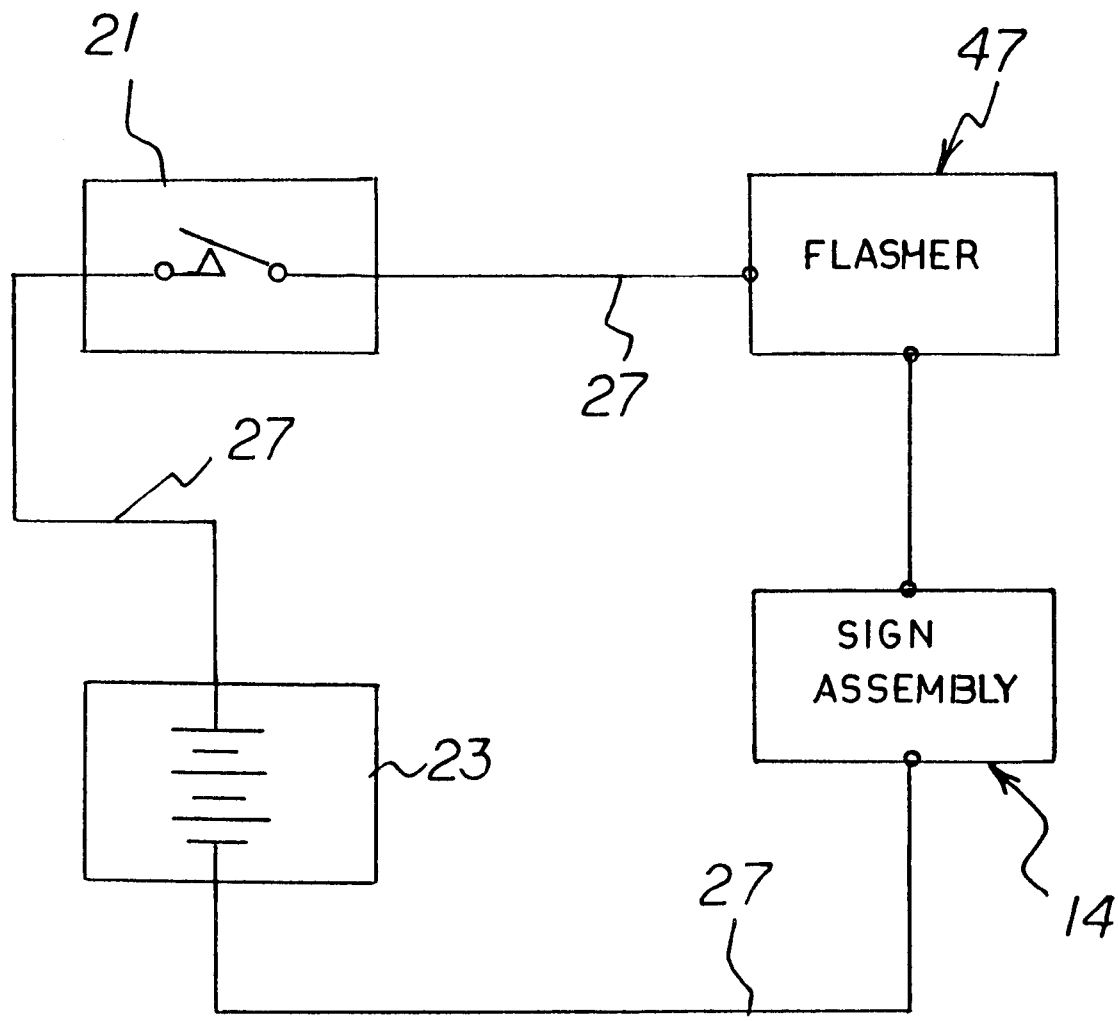
FIG. 7 is an electrical circuit diagram showing circuitry used for illuminating the vehicle-mounted, rear-directed message display apparatus of the invention.

For each of the embodiments of the invention shown in the drawings, the illumination assembly includes electrical circuitry shown in FIG. 7. More specifically, the illumination assembly includes lamps 25 and electrical conductors 27 connected between the lamps 25 located inside the housing 14. The illumination control switch 21 is connected to the lamps 25 by an electrical conductor 27. A battery 23 for the vehicle is employed as the source of electrical power, and an electrical conductor 27 is connected between the illumination control switch 21 and the battery 23. An electrical conductor 27 is connected between the battery 23 and the lamps 25. The illumination control switch 21 can be mounted on the dashboard of the vehicle giving easy access to the driver.

To operate the message display apparatus 10, a driver of the vehicle manually operates the illumination control switch 21. When the illumination assembly is lit, the driver can observe this status by looking in the rear view mirror and seeing illumination through the illumination monitor aperture 28 in the front wall 17 of the housing 14.

In the illumination assembly, the lamps 25 are located forward of the display sign 30. The display sign 30 has an opaque background and transparent letter for the respective message. As a result, when the lamps 25 are lit, the message is backlit for an observer at the rear of the vehicle.

A conventional flasher 47 is installed in the electrical circuit between the on-off switch and the lamps 25 so the lamps 25 will flash on and off when energized, thereby enhancing visibility of the warning message. When the on-off switch is turned on, the warning message flashes on and off like a turn signal, and continues to do so until the control switch is turned off. The driver of the trailing vehicle is much more likely to observe, heed, be impressed by, and comply with a warning message that is flashing on and off, vis-a-vis one that is not.

With reference to the embodiment of the invention shown in FIG. 6, when installing the message display apparatus 10 on the horizontal surface 12 located between the back of the rear seat and the rear window, it may be desirable to tilt the housing 14 with respect to the support base plates 44 at a desired orientation angle. When such is the case, the lock nuts 37 on each support assembly are loosened, the angle of the housing 14 with respect to the support base plates 44 is adjusted to the desired orientation angle, and the lock nuts 37 are retightened to secure the housing 14 at the desired orientation angle.

The components of the vehicle-mounted, rear-directed message display apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle-mounted, rear-directed message display apparatus that is low in cost, relatively simple in design and operation, and which may advantageously be used to provide an illuminated message sign in a front vehicle to warn a following vehicle about following too closely that does not depend upon sensing light from headlights in the following vehicle. With the invention, a vehicle-mounted, rear-directed message display apparatus provides a rear-facing illuminated sign to warn a driver in a following car from following too closely without depending upon a brake pedal sensor for activating the illuminated sign. With the invention, a vehicle-mounted, rear-directed message display apparatus is provided which enables the driver of a front vehicle to have manual control over the illumination of a rear-facing message sign for warning a driver in a following vehicle that the vehicle is following too closely.

With the invention, a vehicle-mounted, rear-directed message display apparatus provides a manually operated switch for an illuminated sign that is independent of the cigarette lighter of the vehicle. With the invention, a vehicle-mounted, rear-directed message display apparatus provides back-lighting for the message of the sign. With the invention, a vehicle-mounted, rear-directed message display apparatus provides a rear window sign that is mounted on the horizontal surface located between the back of the rear seat and the rear window of a vehicle. With the invention, a vehicle-mounted, rear-directed message display apparatus provides a rear-facing sign that a forward-facing aperture that emits light when the rear-facing sign is illuminated. With the invention, a vehicle-mounted, rear-directed message display apparatus provides a rear-facing sign which has a variety of interchangeable messages that would appeal to a variety of drivers.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A vehicle-mounted, rear-directed message display apparatus, comprising:

a housing which includes a transparent rear wall, a front wall, side walls, a bottom wall, and a cover, support assemblies connected to said housing, an illumination assembly supported inside said housing, a display sign supported inside said housing between said illumination assembly and said transparent rear wall, and an illumination control switch electrically connected to said illumination assembly by an electrical conductor, wherein each of said support assemblies includes:

a support base plate, base-plate-to-vehicle fasteners for attaching said support base plate to a horizontal surface located between the back of a rear seat and rear window of a vehicle, a cylindrical riser member connected to said support base plate, a strut adjustably connected to said cylindrical riser member, a strut-to-housing connector portion connected to said strut, a connector-portion-reception bracket, an offset bushing located between said connector-portion-reception bracket and one of said side walls, and fasteners for connecting said connector-portion-reception bracket and said offset bushing to said side wall.

2. The apparatus of claim 1 wherein each of said support assemblies further includes a lock nut connected to a respective strut-to-housing connector portion for locking said respective housing in a selected orientation angle with respect to said respective support assembly.

* * * * *